(12) United States Patent
Warfield et al.

(10) Patent No.: US 7,918,221 B2
(45) Date of Patent: Apr. 5, 2011

(54) INSTALLING A SOLAR PANEL ON A ROOF

(75) Inventors: Donald B. Warfield, Woodbine, MD (US); Paul L Garvison, Frederick, MD (US); Dinesh S. Amin, Clarksburg, MD (US)

(73) Assignee: BP Corporation North America Inc., Warrenville, IL (US)

( * ) Notice: Subject to any disclaimer, the term of this patent is extended or adjusted under 35 U.S.C. 154(b) by 1438 days.

(21) Appl. No.: 10/552,389

(22) PCT Filed: Apr. 15, 2004

(86) PCT No.: PCT/US2004/011525
§ 371 (c)(1),
(2), (4) Date: Oct. 7, 2005

(87) PCT Pub. No.: WO2004/095589
PCT Pub. Date: Nov. 4, 2004

(65) Prior Publication Data
US 2006/0277845 A1    Dec. 14, 2006

Related U.S. Application Data

(60) Provisional application No. 60/463,359, filed on Apr. 16, 2003.

(51) Int. Cl.
*E04H 14/00*    (2006.01)

(52) U.S. Cl. ........ 126/623; 126/569; 126/621; 126/622; 52/173.1; 206/448; 206/454

(58) Field of Classification Search ............... 126/623, 126/569, 621, 622; 52/173.1; 206/448, 454
See application file for complete search history.

(56) References Cited

U.S. PATENT DOCUMENTS

| | | |
|---|---|---|
| 2,950,001 A | 8/1960 | Bucko |
| 3,979,243 A | 9/1976 | DeTorre |
| 4,139,270 A | 2/1979 | Dotson |
| 4,157,639 A | 6/1979 | Saunders |
| 4,162,595 A | 7/1979 | Ramos et al. |
| 4,180,958 A * | 1/1980 | Brody ................. 52/747.11 |
| 4,207,868 A * | 6/1980 | Peterson ................ 126/620 |
| 4,217,887 A * | 8/1980 | Hoffman et al. .......... 126/664 |
| 4,225,043 A | 9/1980 | Lastik |

(Continued)

FOREIGN PATENT DOCUMENTS

DE    9201273    5/1992

(Continued)

*Primary Examiner* — Steven B McAllister
*Assistant Examiner* — Avinash Savani
(74) *Attorney, Agent, or Firm* — Thomas E. Nemo

(57) ABSTRACT

A method and apparatus for installing a solar array on the roof of a residence or the like which uses a pan in the installation of the solar modules that make up the array. The pan may also be used as part of the packaging of the solar modules. The pan is comprised of a length of material having a trough-like cross-section. For packaging, shipping inserts are fitted into the trough of each pan. Opposite edges of a solar module are fitted into respective slots in the inserts of two facing pans and a protector is fitted over each end thereof to form a package for shipping. Once on site, the packages are disassembled, the pans are mounted on the roof, and the modules are connected to the pans to form the array.

12 Claims, 4 Drawing Sheets

U.S. PATENT DOCUMENTS

| | | | |
|---|---|---|---|
| 4,280,484 A | | 7/1981 | Mancosu |
| 4,353,466 A | * | 10/1982 | Pater ............................ 206/453 |
| 4,498,822 A | | 2/1985 | Diba |
| 4,726,559 A | | 2/1988 | Hultmark |
| 4,838,951 A | | 6/1989 | Riermeier et al. |
| 5,164,020 A | * | 11/1992 | Wagner et al. ................ 136/251 |
| 5,953,869 A | * | 9/1999 | Balfour et al. .................. 52/200 |
| 6,020,554 A | | 2/2000 | Kaminar et al. |
| 6,065,255 A | | 5/2000 | Stern et al. |
| 6,534,703 B2 | | 3/2003 | Dinwoodie |
| 2002/0029799 A1 | * | 3/2002 | Yoda et al. .................... 136/251 |
| 2003/0070368 A1 | | 4/2003 | Shingleton |

FOREIGN PATENT DOCUMENTS

| | | |
|---|---|---|
| DE | 20014536 | 11/2000 |
| DE | 20209892 U1 * | 10/2002 |
| JP | 07-153983 | 6/1995 |
| JP | 10231600 | 9/1998 |

* cited by examiner

INSTALLING A SOLAR PANEL ON A ROOF

This patent application claims the benefit of U.S. Provisional Patent Application 60/463,359 filed on Apr. 16, 2003.

FIELD OF THE INVENTION

The present invention relates to mounting solar energy modules on a roof or the like and in one of its aspects relates to the shipping solar modules to a site and then assembling the modules into an array which is mounted on the roof of a building such as a house or the like.

BACKGROUND OF THE INVENTION

In recent years, considerable advances have been made in using photovoltaic cells or the like to directly convert solar energy into useful electrical energy. Typically, a plurality of photovoltaic cells are encased between a transparent sheet (e.g. glass, plastic, etc.) and a transparent or opaque backsheet, to form flat, rectangular-shaped modules (sometimes also called "laminates") of a manageable size (e.g. 2½'×5'). These modules are then shipped to a site where they are assembled into an array onto the roof of a building or the like where the array will be exposed to the sun.

In prior solar array installations, both framed and unframed modules have been mounted onto roof attachment systems (i.e. standoffs) that, in turn, are secured to a roof of a building. For such an array to endure over time, its roof attachment system must withstand all uplift, down forces, and the lateral loads, which will be imposed on the array during its operational life. Unfortunately, many prior-art attachment systems often prove inadequate, especially in withstanding the lateral loads on the array. Further, many attachment systems require additional structural supports in order to compensate for the down forces experienced from time to time. Accordingly, a proper attachment or mounting system for an array can be a substantial part of the overall capital cost of a solar energy system.

The cost of assembling and mounting a solar array is important where the array is of relatively small size, such as an array which is to be mounted on the roof of a residential structure, e.g. a house. That is, the total cost of a solar array, which includes shipping, assembly, and mounting of the array, must be figured into the overall economics of such a system.

One major consideration in economically providing small solar arrays in the market place is in the packaging and shipping of the solar modules to their destination. That is, the edges of unframed modules (e.g. glass plates) are highly susceptible to damage if not packaged properly which, in turn, can add substantially to ultimate costs of the solar energy system. Where a large number of unframed modules are to be shipped to a single location, relatively expensive large wooden crates or cardboard containers are used to enclose the modules on pallets or the like, thereby decreasing the shipping cost per module.

However, the economics involved in the use of these large crates or containers do not fare as well where only a relative small number (e.g. 12) are needed for the array. This is due to the fact that the typical residential solar installer does not have access to the transportation and handling equipment required for the large module crates. Further, these large crates do not provide the flexibility of being able to deliver just the quantity of modules needed for a particular installation. Due to this lack of a secure, cost effective packaging technique for small numbers of unframed modules, higher cost framed modules are most often used for smaller solar arrays.

One factor which has reduced the growth of solar energy systems in the residential and related markets lies in the types of roofing material now commonly used in geographical areas, such as Europe and the US Southwest, and which is gaining in popularity in other areas. That is, many homes, especially upscale residences, now have roofs that are shingled with "tile" material (concrete, ceramic, or like material).

While mounting systems are available for directly mounting solar arrays to more conventional roofs (e.g. asphalt shingles), present systems for mounting an array to a tile roof are costly and time consuming since most require that at least some of the tiles have to be removed. Further complex measurements must be made in order to align the roof attachments, located under the tiles, with holes drilled in the tiles and with the roof structural systems which, in turn, lie above the tiles. Still further, some of these mounting systems require the mounting structure to be attached to the roof rafters rather than to the roof sheathing or decking, thereby requiring additional measurements and trial holes which, in turn, often results in mis-drilled holes through the shingles and leaks.

In view of the above, it can readily be seen that the art needs and improved apparatus and method for the installation of solar modules. The art also needs an apparatus and method for economically shipping and installing small solar energy arrays in order for such solar arrays to be more competitive in certain markets (e.g. residential). The present invention provides such apparatus and methods.

SUMMARY OF THE INVENTION

The present invention provides a method and apparatus that can be used for installing solar arrays on, for example, the ground or the roofs of residences, commercial buildings, or the like. An element in the present invention is a pan that is used in the installation of the solar modules which make up the array and can, optionally, be used for packaging of modules for shipment. That is, the pan may form part of a package, which protects the modules during shipping, and then forms part of the structure used to mount the modules on a roof. However, it is to be understood that the pan of this invention can be used only as a structural element for mounting a solar module and can be shipped and provided separately from the solar module to be mounted.

More specifically, the pan of the present invention is preferably comprised of a length of suitable, preferably non-corrodible material (e.g. a plastic or aluminum) having a substantial trough-shaped cross-section. For example, the pan can have a cross-section shape that is V-shaped, U-shaped and the like. This cross-section effectively forms a trough that has a bottom, two sides that extend upward from the bottom, and a relatively horizontal flange at the top of each of the sides. The preferred cross-section shape is a V-shape. The V-shaped cross-section has sloping sides that extend upwards from the bottom.

The pans may be used for packaging the solar modules by releasably fitting at least one and, preferably a plurality of spaced shipping inserts (e.g. two), into the trough of each pan. Each shipping insert has at least one longitudinal slot and preferably a plurality of parallel, longitudinal slots (e.g. two) which align with respective slots in the other inserts in the trough if more than one shipping insert is used. Each set of aligned slots receives and supports one edge of one or more solar modules, preferably one or more unframed solar modules. The opposite edges of these modules are then positioned into respective slots of a shipping insert or shipping inserts releasably fitted in the trough of another pan to provide a package having one or more parallel modules extending between two pans. A protector (e.g. wooden box-like structure) is preferably fitted over each end of the pans and the corresponding ends of the encased modules to form a complete package for shipping that can be held together by appropriate strapping or other means for securing the package.

Once on site, the packages are disassembled and the shipping inserts are removed from the pans. The pans, whether they were used for shipping or separately provided for, are used to form the mounting structure for the array. That is, each pan is properly positioned on the roof and holes, preferably preformed holes, in the bottom of the trough of the pan can be used as a template to drill aligned holes through the roofing material (e.g. tiles, shingles, etc.) and through the decking of the roof. In a preferred embodiment, a threaded, expandable anchor fastener (e.g. an expansion anchor) is positioned through the aligned holes in the roof and the lower end is anchored below the roof decking. The holes in the pan are placed over the upper end of the fasteners and nuts are threaded thereon to secure the pan to the roof. For tile roofs, padding (e.g. foam pads) is preferably placed under the pans at the points at which the pans contact the roof surface to ensure that damage does not occur to the pans and/or roof tiles. Once installed, lateral loads from the solar array are transferred directly to the roof surface via friction between the pans and the roof shingles or tiles. Alternatively, the pans may be mounted to a support structure which is located on the ground or on the roof of a building.

The pans are suitably installed in spaced, parallel rows, which, if directly mounted to the surface of a sloping roof, preferably effectively run up and down on the roof. The ends of adjacent pans can be overlapped and telescoped within each other to provide the desired length of a particular row. If overlapped, fasteners attaching the pans to the underlying support structure may be shared between overlapping pans. Once the pans are in place, solar modules are then attached (e.g. by adhesive, clips, or the like) between respective rows of pans to form the solar array.

BRIEF DESCRIPTION OF THE DRAWINGS

The actual construction operation, and apparent advantages of the present invention will be better understood by referring to the drawings, not necessarily to scale, in which like numerals identify like parts and in which.

While the invention will be described in connection with its preferred embodiments, it will be understood that this invention is not limited thereto. On the contrary, the invention is intended to cover all alternatives, modifications, and equivalents that may be included within the spirit and scope of the invention, as defined by the appended claims.

DETAILED DESCRIPTION OF THE INVENTION

Figure 1:
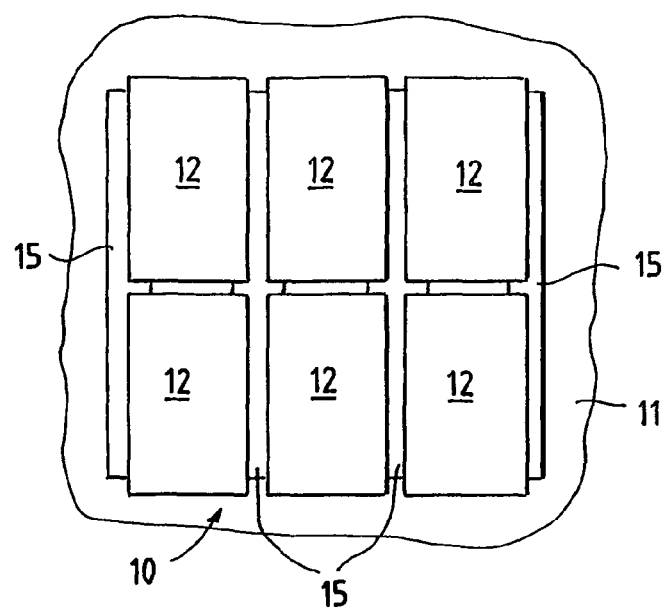
FIG. 1 is a top view of a typical solar array installed on a roof of a structure in accordance with an embodiment the present invention (Full details of pan 15 are not shown in FIG. 1. One embodiment of a pan 15 is shown in greater detail in FIGS. 2 and 3.)

Referring now to the drawings, FIG. 1 illustrates a typical solar array 10 which has been mounted on a roof 11 in accordance with an embodiment of the present invention. Array 10 is comprised of a plurality (six shown) of solar laminates or modules 12, which have been positioned on and secured to mounting structures (i.e. pans 15 as will be more fully discussed below). As will be understood in the art, a laminate or module 12 (hereinafter "module") is typically formed by positioning a plurality of photovoltaic cells (not shown) between a sheet of a transparent material (e.g. glass, plastic, etc.) and another sheet of, for example, opaque or transparent material, whereby the finished module is effectively a flat, plate-like structure as shown in the figures. The modules 12 are then positioned so that the photovoltaic cells will be exposed to the sun for converting its solar energy directly into electricity.

In accordance with the present invention, a unique mounting structure, i.e. pan 15, can be used in the shipping of the modules, and in the assembling and installing of the modules once they reach their destination. As will be further discussed below, pans 15 allow the array 10 to be installed onto a variety of different types of support structures, on roofs (e.g. concrete, slate, ceramic, wood, asphalt roofs, etc.) of, for example, residential dwellings, and like structures. This makes the use of relatively small solar arrays in residential environments both more practical and economical.

Figure 2:
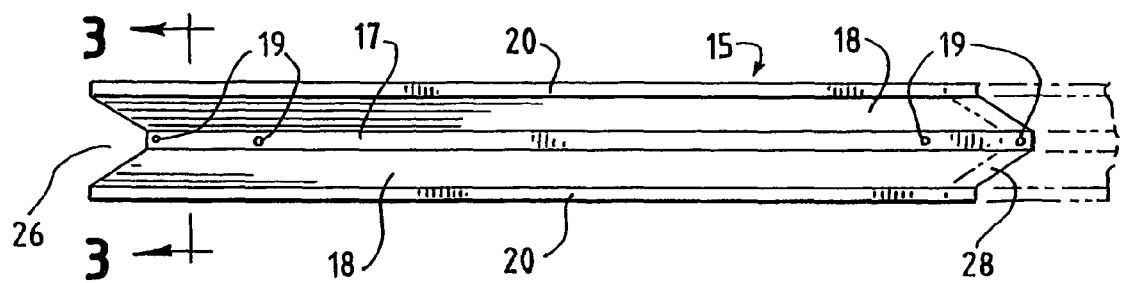
FIG. 2 is a plan view of a generally V-shaped pan, which can be used in installing the array of FIG. 1.
Figure 3:
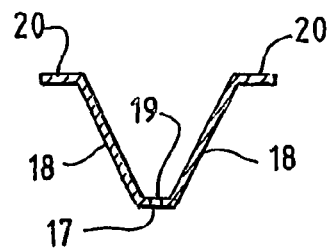
FIG. 3 is a cross-sectional view taken along line 3-3 of FIG. 2.

One embodiment of pan 15, as best seen in FIGS. 2 and 3, is comprised of an elongated, V-shaped trough-like element having a bottom 17, two sloped sides 18 extending upward from said bottom, and a relatively horizontal flange 20 at the upper end of each side 18 (see FIG. 3). As used throughout herein, terms such "bottom," "upward," "horizontal," etc. are relative and describe the pan as view in FIG. 3. Although a V-shaped pan is a preferred shape for the pan of this invention, the shape is not so limited. It can, for example, be a U-shaped, with rounded or angular corners at the bottom of the U, pan or other trough-shaped pan.

Pan 15 is preferably comprised of a suitable material (e. g. aluminum, steel or other metal, plastic, etc.), preferably of a non-corrodible material such as aluminum or a plastic, and is preferably integral in construction (e. g. stamped, extruded or molded in one piece). For illustrative purposes only, a typical pan 15 can be about 60-65" long and may have the following dimensions as viewed in FIG. 3: width between outer edges of flanges 20 is about 7½/"; height of sides 18 is about 5- 7"; and width of the surface of each flange 20 is about 1"). However, it should be recognized that these dimensions can vary substantially without departing from the present invention. Bottom 17 of each pan 15 preferably has a plurality of spaced holes 19 therethrough for a purpose discussed below. Pan 15 may have "beveled" ends. As shown in FIG. 2, end 26 may be beveled inward and end 28 may be beveled outward. However, one or both such beveled ends, either inward or outward, is optional.

Due to the size of a typical module 12 (e.g. 2½'×5') and the fragile nature thereof, the shipping of such modules without experiencing some damage can be a challenge. Where large numbers of modules 12 are required at a single site, large expensive containers and equipment are, routinely employed to crate and deliver these modules. However, where only a small number of modules are required to install a solar array (such as one on a roof of a residence), the cost of such shipping adversely impacts the overall cost of installing such solar arrays. Accordingly, one embodiment of the present invention allows a relatively small number of modules to be safely and economically shipped to a site for installation onto the roof of, for example, a private dwelling or the like.

Figure 9:
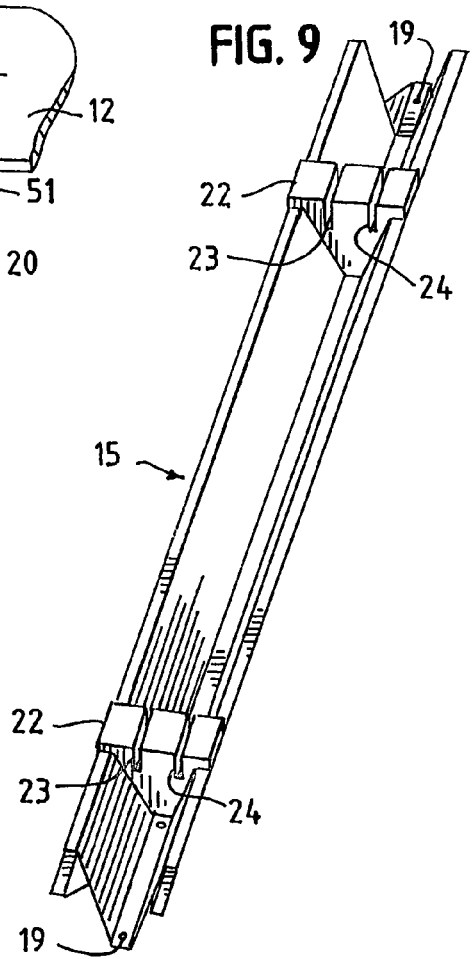
FIG. 9 is a perspective view of the pan of FIG. 2 with shipping inserts fixed therein.
Figure 10:
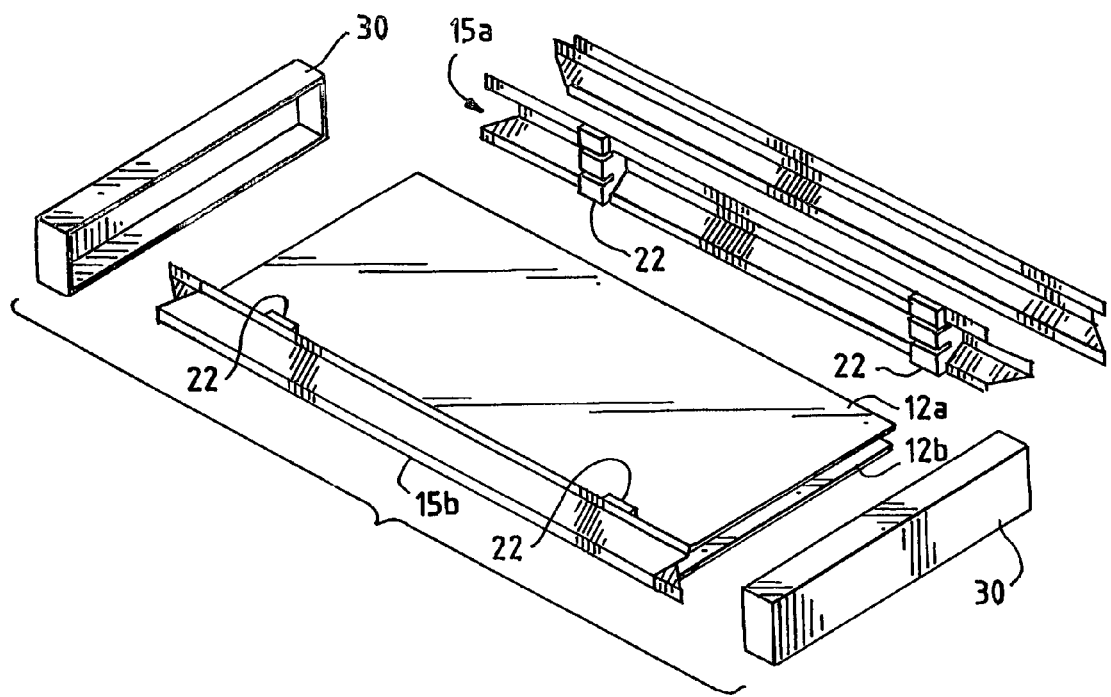
FIG. 10 is an exploded view of an intermediate step in the packaging of two of the solar modules of FIG. 1 using the pans of FIG. 2.
Figure 11:
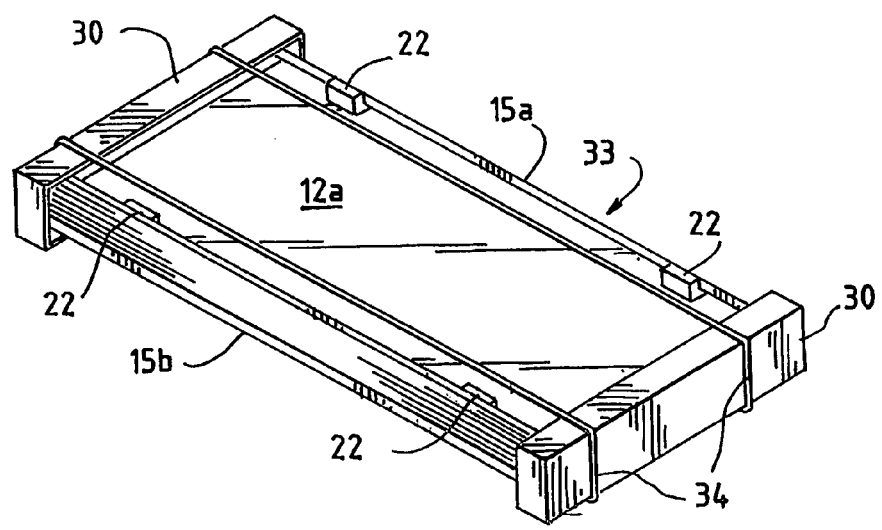
FIG. 11 is a perspective view of the assembled parts of FIG. 10 into a complete package ready for shipping.

Referring now to FIGS. 9-11, in accordance with the present invention, the pans 15, which are used in installing the modules, can be used as part of the packaging of the modules. This results in a reduction of packaging and, hence, shipping costs for the solar modules. To do this, shipping inserts 22 are shaped to conform to the trough of the pans 15 and are friction-fitted or otherwise secured therein. The inserts 22 can be comprised of any appropriate, preferably compliant, material (e.g. expanded polystyrene or polyethylene foam, or the like) and has at least one horizontal slot and preferably a plurality (i.e., at least two) vertically spaced, substantially horizontal slots 23, 24 (e.g. two as shown) across the face thereof. (Horizontal and vertical here mean with respect to the pan laying lengthwise on a horizontal surface.) A plurality of inserts 22 (e.g. two as shown) are spaced from each other in a pan and are positioned so that the relatively horizontal slots 23, 24 in the inserts are respectively aligned to provide longitudinal, parallel slots across the pan. In the preferred arrangement, two or more inserts are used in each pan. However, it is to be understood that one insert, preferably the length or about the length of the pan can, also be used. As shown in FIG. 9, two pans (or more if desired) can be nested, one within the other. Also, the pans in FIG. 9 each have one end beveled inward and one end beveled outward.

As seen in FIG. 10, one side or edge of a module 12a is fitted into aligned slots 23 in spaced inserts 22 in pan 15a and another module 12b is fitted into aligned slots 24 of the spaced insert 22. The other, free edges of modules 12a, 12b are then fitted into respective aligned slots 23, 24 in the inserts 22 of a second pan 15b so that modules 15a, 15b lie substantially parallel to each other between the respective pans 15 which protect the edges of the modules. In some instances, more than one module (e.g. two) can be fitted into each of the slots 23, 24 whereby, for example, four modules are enclosed between two pans. As shown in FIG. 10, pans 15a and 15b can comprise two nested pans. Pan 15a shows the pans to be nested in an apart position. Pan 15b shows the pans nested together.

To protect the ends of the modules 12a, 12b after they are snugly in place between pans 15a, 15b, a box-like protector 30 (FIGS. 10 and 11) is preferably fitted over each end of the modules 12a, 12b and the corresponding ends of pans 15a, 15b to form a completed package 33 which protects these components during shipping. Package 33 can be releasably secured together by strapping 34 (FIG. 11) of any appropriate strap material (e.g. plastic, steel, low-stretch elastic, etc.), or any other appropriate means for releasably securing the package. The protectors 30 can be constructed from any appropriate material (e.g. wood) as long as the strength of the protectors provides the necessary protection against the impacts and related forces normally expected to be encountered during shipping.

A relative small number of these completed packages 33 (e.g. five packages containing up to a total of twenty modules) can then be packed into a relative small shipping carton or crate (not shown) which is easily manageable in most routine shipping operations. Such packaging can provide for smaller solar arrays (e.g. required by residences and the like) to be delivered economically.

Figure 4:
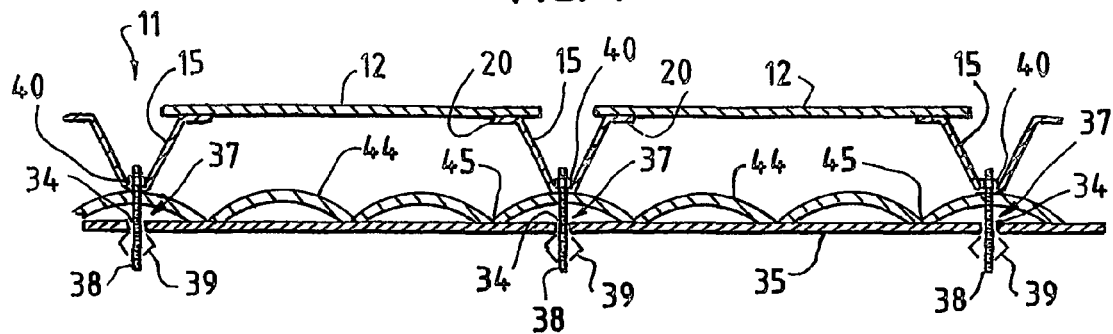
FIG. 4 is a frontal view, partly in section of a solar array installed in accordance with an embodiment of the present invention on a tile roof.
Figure 5:
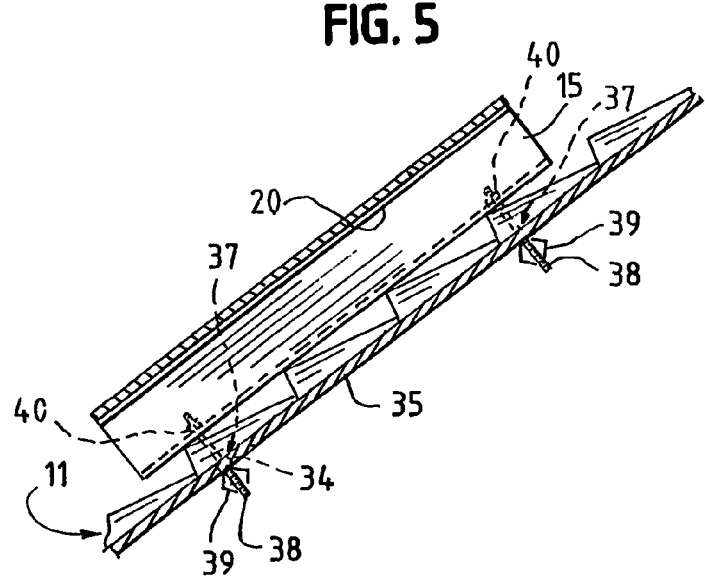
FIG. 5 is a side view, partly in section, of a solar array installed in accordance with an embodiment of the present invention on a conventional shingled roof.

Once the completed packages 33 are on site, the packages are disassembled and the shipping inserts 22 are removed from the pans. Pans 15 are then fixed to a roof in, preferably, parallel rows to provide the mounting support for the modules 12 as shown in FIGS. 1, 4, and 5. As mentioned above, the present invention can be used to mount solar arrays on tile roofs (e.g. concrete, ceramic, etc., FIG. 4) as well as on more conventional shingled roofs (e.g. asphalt, wood, etc., FIG. 5). FIG. 5 shows a pan having straight rather than beveled ends.

FIG. 4 illustrates solar array 10 as it is mounted on a "Spanish tile" or like roof which uses roofing components 44 (only a few numbered) that are curved or arced, "shingles" of concrete or ceramic materials. Rows of components or tiles 44 are overlapped on the roof so that the troughs 45 formed therebetween furnish channels for draining water off the roof, as will be understood in this art.

Using holes 19 in pan 15 as a template, aligned holes can be drilled through tiles 44 and through roof decking 35 and a fastener 37 can be positioned through aligned holes 19 and 34. While fastener 37 may be any appropriate fastener, preferably fastener 37 is a threaded bolt or screw 38 having an expandable anchor 39 on the lower end thereon, e.g., commercially available "expansion anchors." The fastener can be pushed downward through the holes until the anchor 39 clears the bottom of decking 35. Screw or bolt 38 can be suitably gripped and pulled upward to expand and set anchor 39 below the underside of the decking 35.

Holes 19 in a pan 15 are positioned over the upper ends of respective screws or bolts 38 and nuts 40 are suitably threaded onto the screws or bolts to secure the pan in place. Of course, appropriate rubber grommets, washers (not shown) or the like can be positioned around the screws or bolts where they pass through any or all of the respective holes to prevent leakage around the screws, as will be understood in the art. For tile roofs, padding (e.g. foam pads) is preferably placed under the pans at the points at which the pans contact the roof surface to ensure that damage does not occur to the pans and/or roof tiles. Once installed, lateral loads from the solar array at transferred directly to the roof surface via friction between the pans and the roof shingles or tiles. Any type of fastener, if a fastener is used, can be used to secure a pan of this invention to a roof or other support structure. For example, one or more of screws, bolts, nails, adhesive, rivets and the like can be used.

Typically, as set forth above, a pan 15 can be approximately 60-120 inches long. If a longer length is needed for a particular installation, the respective ends of adjacent pans can be telescoped, one within the other (see dotted lines in FIG. 1) to provide the longer lengths. The troughs within the so overlapped or "shingled" pans provide drainage channels for water under the array 10 and off the roof, and also share attachment points with the underlying support structure or roof surface. As seen in the drawings, pans 15 are preferably aligned into parallel rows which are spaced from each other at a distance which is less than the width of a module (FIG. 1) or the length of a module (FIG. 6), depending on the particular installation.

Figure 7:
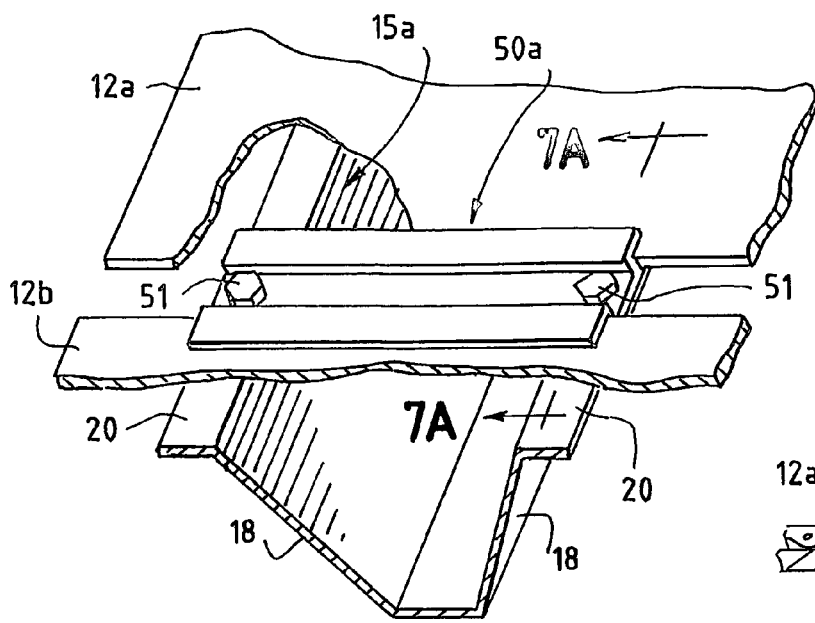
FIG. 7 is a perspective view of double clamp which can be used to secure respective sides of two adjacent solar modules to a pan as shown in FIG. 6.
Figure 7A:
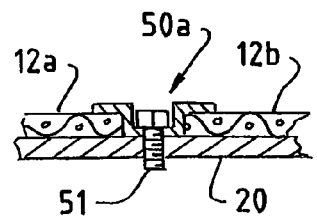
FIG. 7A is a cross-sectional view taken through line 7A-7A of FIG. 7.
Figure 8:
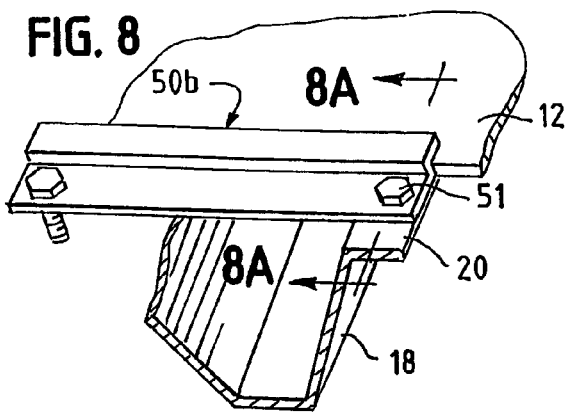
FIG. 8 is a perspective view of a single clamp, which can be used to secure a single side of a module to a pan as shown in FIG. 6.
Figure 8A:
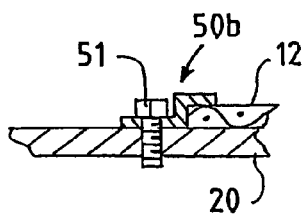
FIG. 8A is a cross-sectional view taken through line 8A-8A of FIG. 8.

Once all of the pans have been properly spaced and secured to the roof or support structure, solar modules are then attached to the pans to complete the solar array. Modules 12 may be "glued" onto the flanges 20 of pans 15 (see FIG. 1) with a commercially available adhesive, e.g. silicone adhesives such as GE RTV108, or can be secured to the flanges 20 by clips 50 (see FIGS. 6-8) or the like.

Figure 6:
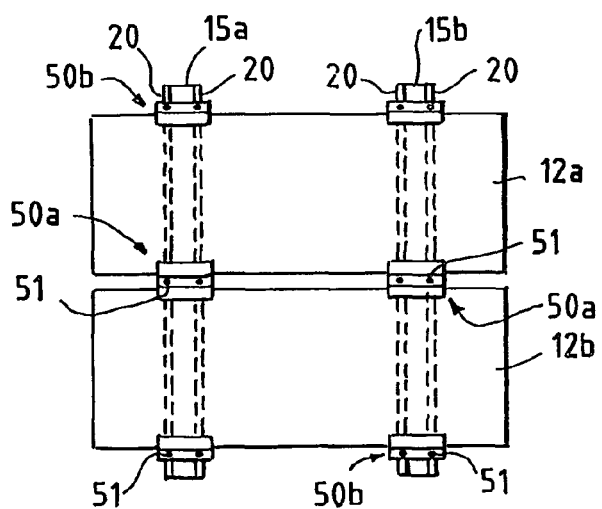
FIG. 6 is a top view another array installed in accordance with an embodiment of the present invention using clamps to secure the solar modules to the pans.

While clips 50 may have various configurations, preferably these clips are formed from short lengths of a stepped-channel material (e.g. aluminum stripping or the like). For example, FIG. 7 discloses a "double" clip 50a that is preferably used to partially secure two modules to the flanges 20 of pans 15. That is, clip 50a secures one side of one module 12a and one side of a spaced, adjacent module 12b to respective flanges 20 of the same pan 15a (see FIGS. 6, 7) by screws or bolts 51 or the like. Typically, two spaced, double clips 50a are used to firmly secure the respective edges of adjacent modules between two spaced pans 15a, 15b as shown in FIG. 6. Single clips 50b (FIGS. 6, 8) are similar to the double clips 50a except clips 50b only secures one edge of a single module to a flange 20, these clips preferably being used to secure the outermost modules in the array.

U.S. Provisional Patent Application 60/463,359, filed on Apr. 16, 2003, is incorporated herein by reference in its entirety.

What is claimed is:

1. A method of packaging solar modules for shipping, said method comprising:

releasably positioning a plurality of first spaced shipping inserts into the trough of a first pan, wherein said first pan is used for installing at least one of the solar modules during use, said first pan comprising a length of a material having a trough-shaped cross-section which forms said trough; each of said first spaced shipping inserts having a plurality of parallel slots therein which align with said slots in the other of said first spaced shipping inserts to thereby effectively provide a plurality of parallel slots across said first pan when said first spaced shipping inserts are within said trough of said first pan, wherein each of said first spaced shipping inserts having a shape conformed to said trough, and each of said first shipping inserts position generally transverse to said length of said first pan;

placing one edge of a solar module into each of said parallel slots in said first spaced shipping inserts;

releasably positioning a plurality of second spaced shipping inserts into the trough of a second pan, wherein said second pan is used for installing at least one of the solar modules during use, said second pan having the same construction as said first pan; each of said second spaced shipping inserts having a plurality of parallel slots therein which align with said slots in the other said second inserts to thereby effectively provide a second plurality of parallel, longitudinal slots across said second pan when said inserts are within said trough of said second pan, wherein each of said second spaced shipping inserts having a shape conformed to said trough, and each of said second spaced shipping inserts position generally transverse to a length of said second pan; and placing the opposite edge of each of said solar modules into a respective parallel slot in said second spaced shipping inserts to thereby protect said edges of said module during shipping.

2. The method of claim 1 further comprising positioning a protector over each end of each of said pans and each of said solar modules after each of said modules are placed within each of said slots of each of said spaced shipping inserts of said first and second pans to thereby protect said ends of said modules during shipping.

3. The method of claim 2 further comprising securing each of said pans and said protectors around said modules to thereby form a complete package for shipping.

4. A method of installing an array of solar modules onto a roof, said method comprising:

positioning a plurality of pans on said roof, each of said pans comprised of a length of material having a trough-shaped cross-section which forms a trough, said trough having a bottom which is attached to said roof, two sloping sides extending upward from said bottom, and a relatively horizontal flange at the top of each of said sides;

securing said pans to said roof;

securing said solar modules to said flanges of adjacent pans, with clips affixed to said flanges by bolts, wherein said bolts pass through said clips and into said flanges; and removing one or more shipping inserts from each of said pans before installing said array of solar modules.

5. The method of claim 4 wherein said solar modules are further secured to said flanges by adhesive.

6. The method of claim 4 wherein said solar modules are secured to said flanges by single clips or double clips of stepped-channel material.

7. The method of claim 4 wherein the step of attaching said pans to said roof comprises:

positioning each pan in its desired position on the roof;

drilling holes through the roof;

passing a fastener through the drilled holes and anchoring said fastener to said roof; and securing said pan to said fastener.

8. The method of claim 7 wherein said holes in said bottom of said pan are preformed.

9. The method of claim 7 wherein said fastener is a threaded element with an expandable anchor at one end thereof.

10. The method of claim 1 wherein said trough-shaped cross-section is a V-shaped cross-section.

11. The method of claim 4 wherein said trough-shaped cross-section is a V-shaped cross-section and wherein said sides are sloping sides extending upward from said bottom.

12. The method of claim 1 wherein said length comprises about 60 inches to about 65 inches.

* * * * *